May 7, 1963 H. BORSUK 3,088,207
DENTAL CAVITY FILLING DEVICE
Filed March 3, 1961 3 Sheets-Sheet 1
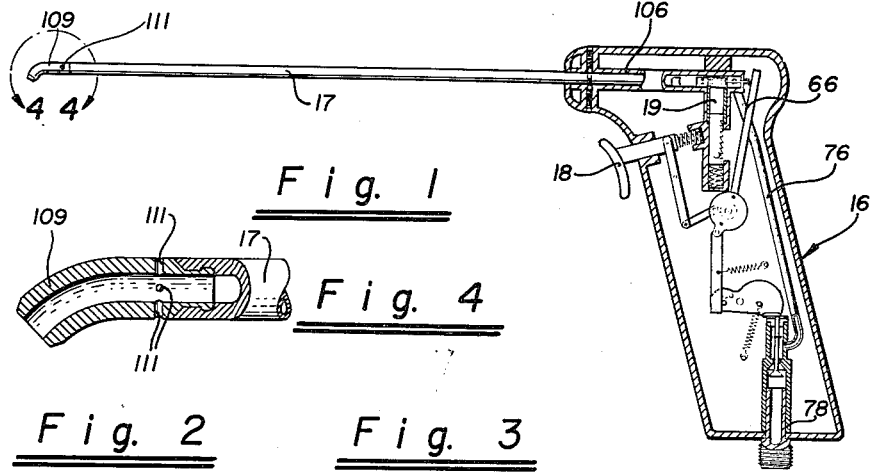
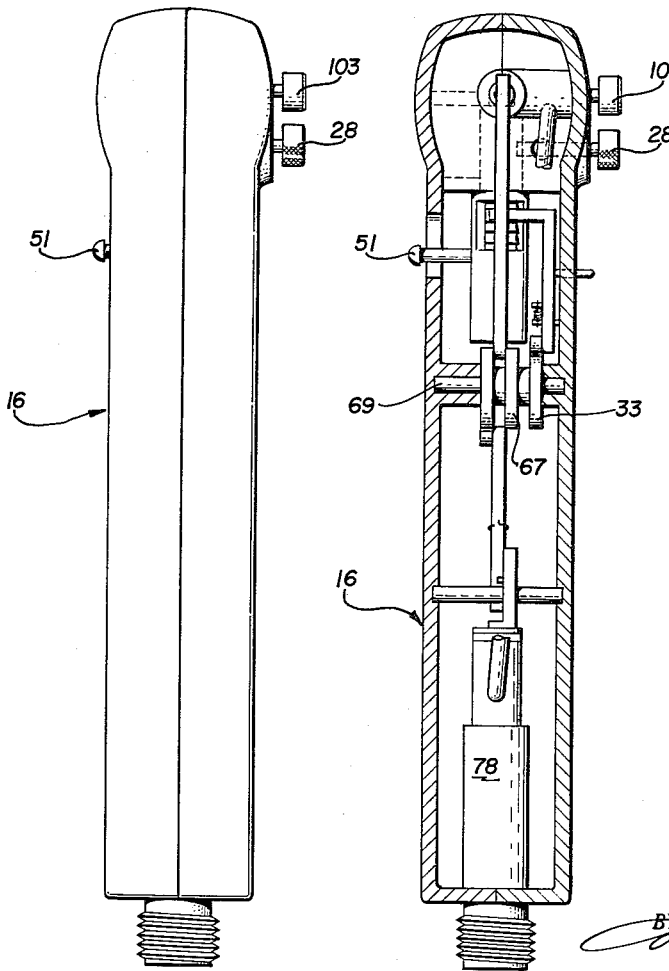
INVENTOR
Harold Borsuk
BY
His Attorney May 7, 1963  H. BORSUK  3,088,207
DENTAL CAVITY FILLING DEVICE
Filed March 3, 1961  3 Sheets-Sheet 2

INVENTOR.
Harold Borsuk
BY Manfred M. Warren
His Attorney

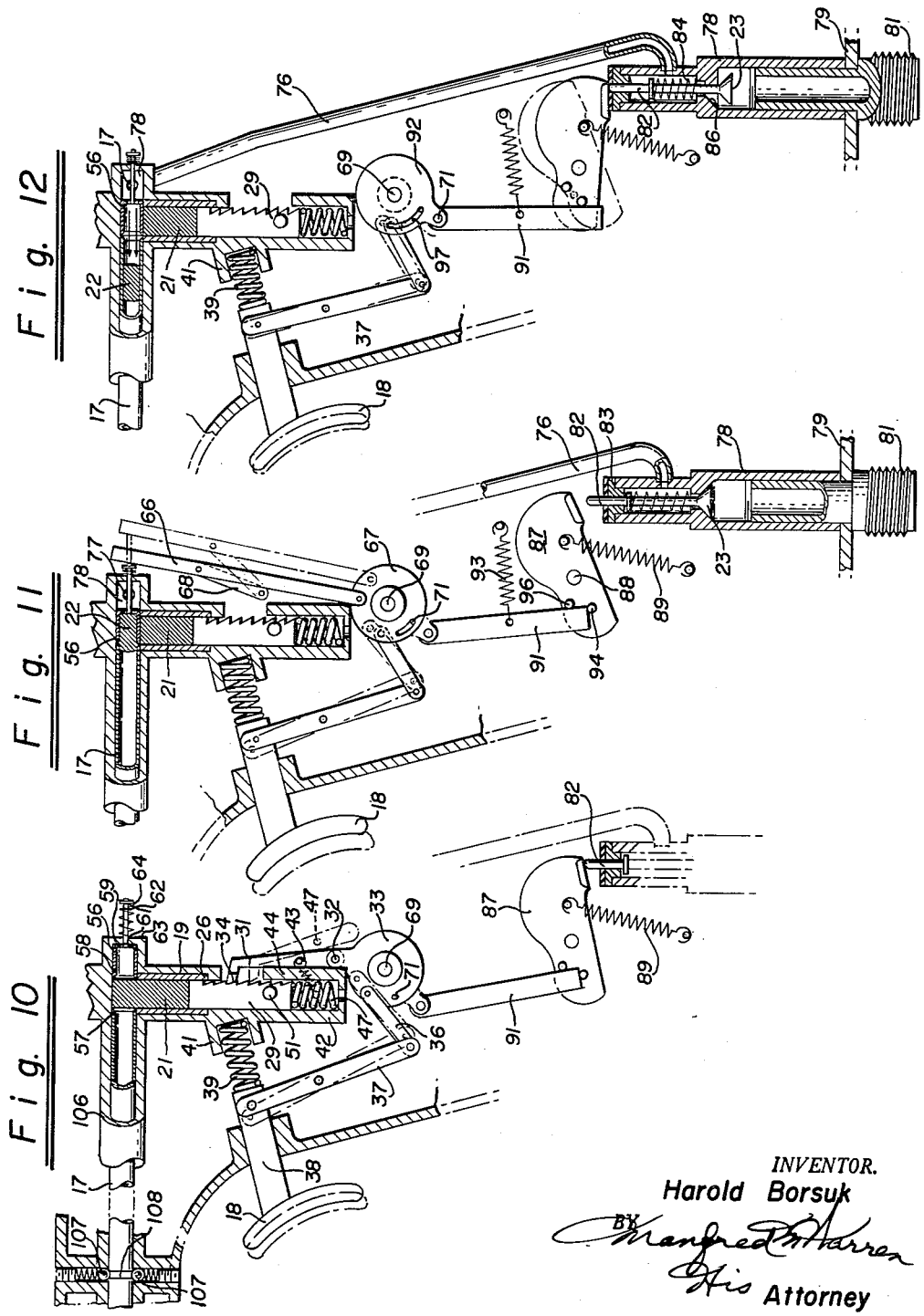

United States Patent Office 3,088,207
Patented May 7, 1963

3,088,207
DENTAL CAVITY FILLING DEVICE
Harold Borsuk, P.O. Box 968, Pittsburg, Calif.
Filed Mar. 3, 1961, Ser. No. 93,124
4 Claims. (Cl. 32—69)

The invention relates to instruments used for inserting and compacting plastic dental filling materials into prepared cavities.

An object of the present invention is to provide an instrument of the character described which will insure an intimate and precise confirmation of the plastic filling material to all of the internal walls of the cavity with complete filling of the cavity and with excellent compaction and condensing of the material therein, all with ease and facility and with the use of a minimum of labor or effort on the part of the operator.

Another object of the present invention is to provide an instrument of the character above which is relatively lightweight and which may be easily and conveniently handled in and around the mouth of the patient and easily and quickly and precisely positioned in registration with the tooth to be filled and in which all of the parts of the instrument which are inserted in the patient's mouth may be readily dismantled, cleaned and maintained in a sterilized, sanitary condition.

A further object of the present invention is to provide an instrument of the character described which is adaptable for use with various types of self-setting plastic tooth filling materials.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings (three sheets):

FIGURE 1 is a side elevation of a dental cavity filling device constructed in accordance with the present invention and with portions shown in cross-section to reveal internal parts.

FIGURE 2 is an end elevation on a somewhat enlarged scale.

FIGURE 3 is a cross-sectional view of the device taken substantially on the plane of line 3—3 of FIGURE 1 and on the same scale as FIGURE 2.

FIGURE 4 is a fragmentary side elevation, partially in section, and on an enlarged scale of the forward tip of the instrument.

FIGURE 10 is a fragmentary cross-sectional view showing a portion of the operating mechanism.

FIGURE 11 is a cross-sectional view of a portion of the mechanism and which may be correlated to FIGURE 10.

FIGURE 12 is a cross-sectional view showing a portion of the mechanism and which may be correlated in operation with the mechanism illustrated in FIGURES 10 and 11.

Figure 5:
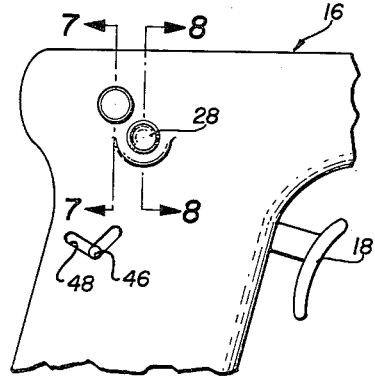
FIGURE 5 is a fragmentary side elevation of a part of the instrument.

With reference to the accompanying drawing the dental cavity filling device of the present invention consists briefly of a manually held housing 16 including a barrel 17 and a manually engageable and displaceable operating member 18 and a chamber 19 adapted for receipt of a plastic cavity filling material 21, see FIGURES 10, 11 and 12; means generally depicted in FIGURES 10 to 12 conected to member 18 and actuated thereby adapted for forming and advancing into the barrel 17 a pellet 22 of the material 21; a valve 23 mounted for controlling the admission of gas under pressure to the barrel behind the pellet for driving the latter through the barrel to a tooth to be filled; and means best shown in FIGURES 11 to 12 connecting the operating member 18 to the valve 23 for opening the valve sequential to the placement of a pellet 22 in the barrel 17.

Figure 8:
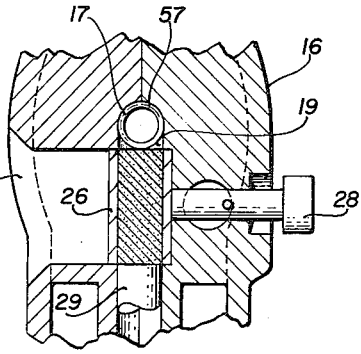
FIGURE 8 is a fragmentary cross-sectional view on an enlarged scale taken substantially on the plane of line 8—8 of FIGURE 5.

The instrument is designed for use with compressed air normally available in dental offices although it may also be used with other gases under pressure such as bottled gas and the conventionally obtainable carbon dioxide cartridges. The dental cavity filling material 21 may be any of the conventional plastic materials used for this purpose and the instrument is considered particularly effective in the use of silver-mercury amalgam. Any of these materials set up in a reasonably short period of time and as a feature of the present construction a separate removable holder 26 is provided for the plastic cavity filling material and which is demountably positioned in the housing 16 and which may be readily removed with any unused material may have set up and hardened in the intervening time from the use of the instrument. Accordingly, the operator may insert a holder 26 with freshly prepared material, use as much of the material as is required, and not be concerned with the need to remove the holder or the material from the gun immediately after use to prevent the material from setting up within the instrument preventing its subsequent use without difficult cleaning. As will be best seen from FIGURES 6 and 8 the housing 16 is formed with a side opening 27 through which the holder 26 may be inserted for positioning in the chamber 19. An ejection pin 28 engageable from the other side of the housing may be manually engaged and depressed to eject holder 26 out through opening 27 as generally illustrated in FIGURE 8. Thus, any material left in the instrument after its use will merely set up and harden in the holder 26 and may be easily and simply removed by ejection of the holder as described.

Means for advancing the material from the holder 26 to the barrel here includes a plunger 29 which is movable longitudinally through the tubular holder 26 for advancing a column of material into registration with the barrel. Preferably, this displacement of the plunger is effected by a ratchet mechanism best illustrated in FIGURE 10 and which includes a pawl 31 having one end pivotally mounted as at 32 to the arm of a crank wheel 33 and having its other end movable into and out of engagement with rack teeth 34 on the plunger 29. Rotation of crank wheel 33 is effected by a link 36 connected thereto and in turn connected to one end of a lever 37 pivoted at its opposite end to the reciprocating shank 38 of member 18, the arrangement providing a stepped advancement of the plunger at the initiation of the stroke of the member 18, the material 21 being advanced during the first portion of the stroke as depicted in the phantom lines in FIGURE 10. Member 18 is returned to its initial position upon manual release by spring 39 mounted between the inner end of shank 38 and a spring rest 41 provided on a portion of the interior of the housing also providing a slide compartment 42 for the plunger 29. Thus, on release of member 18, the connected parts including the pawl 31 will return to initial position as shown in phantom line in the figure. Also, preferably the pawl and ratchet functions over only the initial portion of the stroke. As here shown pawl 31 is constantly urged in the direction of engagement with ratchet teeth 34 by means of a spring 43, and a portion 44 of the compartment 42 is positioned to engage the pawl 31 after the latter is moved through an initial portion of its stroke and displace the pawl outwardly, out of engagement with teeth 34 during the balance of the stroke. This is accomplished by relative positioning of the parts 44 and rotating pivot 32 as seen in FIGURE 10.

Figure 6:
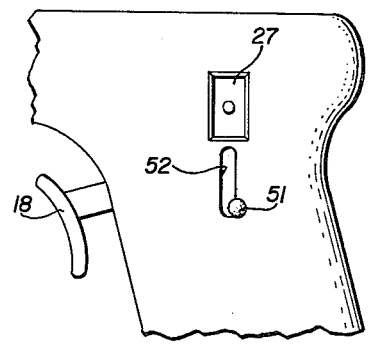
FIGURE 6 is a fragmentary side elevation of the opposite side of the instrument.

In order to aid in the stepped advancement of the plunger 29 and to maintain it in contact with the filling material, a spring 47 may be mounted at the underside of the plunger within the slide compartment 42 as shown so as to constantly urge the plunger longitudinally into and through the holder 26. When it is desired to remove the holder 26 after the filling of one or more cavities, the pawl 31 may be manually withdrawn from ratchet teeth 34 to permit sliding of plunger 29 out of container 26 when the latter may be ejected by the use of ejection pin 28 as above described. As here shown a manually engageable pin 46 is provided on pawl 31 and which projects out through a side opening in the housing 16, see FIGURE 5, and which may be engaged and laterally displaced to dissengage the pawl from the ratchet teeth 34. Similarly, plunger 29 is provided with a pin 51 which projects out through a side opening 52, see FIGURE 6, and which may be manually engaged and displaced to withdraw plunger 29 out of tubular holder 26 so as to free the latter for withdrawal from the instrument. Preferably, opening 52 is provided with an offset base portion into which the pin 51 may be laterally displaced and held, as seen in FIGURE 6, so as to hold plunger 29 in a retracted position as illustrated in FIGURE 8 and against the resistance of spring 47, the upper end of the plunger in such position clearing side opening 27 to permit insertion or removal of a holder 26.

The forming and positioning of the individual pellet 22 is here controlled by a tube 56 which is mounted for reciprocation in chamber 19 for movement across the column of material 21 to shear off and form an individual pellet 22 as generally depicted in FIGURES 10 and 11 and to position the pellet so formed in endwise registration with the barrel 17 and with the pellet formed for sliding peripheral fit in the barrel. As here shown tube 56 has an internal diameter the same as the internal diameter of barrel 17 and is mounted in chamber 19 in axial alignment with the internal end 57 of the barrel. Accordingly, when tube 56 is displaced, to the left as seen in FIGURES 10 and 11, one end 58 of the tube comes in contact with the material column and shears it off and then moves up into contact with end 57 of the barrel so as to pinch off the column and to form and shape the pellet 22 to fit the barrel. Displacement of tube 56 so as to form and position pellet 22 is here arranged to be effected by the manually operated member 18 and in sequential relation to the stepped advancement of plunger 29 above described. As here shown the remote end 59 is connected by an open spider 61 to a pin 62 which projects axially from tube 56 through a wall 63 of the housing defining chamber 19. A spring 64 mounted between wall 63 and a retainer on the outer end of pin 62 constantly urges tube 56 to a retracted position spaced from the inner end 57 of the barrel, as illustrated in FIGURE 10. Displacement of pin 62 is here effected by a lever 66 having a free end in juxtaposition to the outer end of pin 62 and an opposite end pivoted to a crank wheel 67 which is journalled for rotation coincidentally with crank wheel 33 and rotated thereby with delayed action. A link 68 pivoted to lever 66 and to the housing effects a reciprocal displacement of the outer end of the lever upon rotary displacement of crank wheel 67. As will be seen from FIGURES 3, 9, 10 and 11 crank wheels 33 and 67 are mounted for coaxial rotation on a common shaft 69. A driving pin 71 on wheel 33 projects axially through an arcuate slot 72 in wheel 67 and the parts are so arranged that the pin merely swings through an open portion of slot 72 during the initial displacement of member 18, and picks up and displaces wheel 67 only after such initial displacement. The extent of this delayed action is generally shown in phantom line in FIGURE 11 from which it will be seen that tube 56 is not displaced across the column of material 21 to form pellet 22 until after plunger 29 is displaced to move the column into the chamber as illustrated in FIGURE 10. With reference to FIGURES 1 and 12 it will be seen that the housing is provided with an air or compressed gas passage 76 which is under the control of valve 23 and leads to the barrel behind pellet 22 for propelling the pellet through the barrel to a tooth to be filled. As here shown that portion of chamber 19 arranged in axial alignment with barrel 17 and which slidably receives tube 56 is formed with a side opening 77 which is uncovered by the forward movement of tube 56 as seen in FIGURES 11 and 12 so as to admit compressed gas into the end 78 of the chamber behind pellet 22, the compressed gas being able to flow through the open spider connection 59 of pen 62 to tube 56. A conduit providing passage 76 here extends from opening 77 to a valve housing 78 containing valve 23. The valve housing 78 here extends to an outer wall 79 of housing 16 and is there secured to a fitting 81 suitable for the attachment of a conduit leading to a source of gas under pressure. Valve 23 is here formed with a stem 82 which is mounted for reciprocation in and projects from one end wall 83 of the valve housing 78. A spring 84 mounted between the housing 78 and a retainer on stem 82 normally urges valve 23 to its seat 86 and stem 82 to an extended position from end wall 83 as illustrated in FIGURE 11. Opening of valve 23 is here effected by a hammer 87 which is pivoted as at 88 to strike the outer end of stem 82. A light spring 89 normally holds the hammer 87 in a position of rest against the outer end of stem 82, the valve 23 being nevertheless maintained in a closed position by the over-riding action of spring 84 which is somewhat stronger than spring 89. However, on appropriate displacement of member 18 as illustrated in FIGURES 11 and 12, hammer 87 is swung to a cocked position and released for striking the outer end of stem 82 and momentarily opening the valve to send a burst of compressed gas up to the chamber 78 for propelling the pellet through the barrel. This cocking of hammer 87 is effected by a link 91 which is here pivoted to an arm on crank wheel 92 and which is normally supported by spring 93 upon a pin 94 on the hammer. As crank wheel 92 is displaced in a counter-clockwise direction as seen in FIGURES 11 and 12 the lower end of link 91 bears down upon pin 94 to rotate hammer 87 in a counter-clockwise direction, and as this action proceeds a second pin 96 on the hammer engages and laterally displaces link 91 off from its supported position on pin 94 to thereby release hammer 87 for movement by its spring 89 against the outer end of bell stem 82. The inertia of hammer 87 will momentarily drive open valve 23, thereby providing the desired blast of compressed gas, with the valve spring 84 immediately thereafter gaining control over the connected parts and restoring them to their normal position of rest as seen in FIGURE 11. Upon return movement of crank wheel 92, link 91 will again ride up and over pin 94 to the normal position at rest shown in FIGURE 11.

Crank wheel 92 is journalled on shaft 69 coaxially with crank wheels 33 and 67 and wheel 92 is formed with an arcuate slot 97 which receives drive pin 71 and provides for a delayed action rotation of wheel 92 only after wheel 67 has been rotated to form and position pellet 22 as above explained. This is accomplished by making slot 97 somewhat longer than slot 67 as may be seen in FIGURES 9, 11 and 12. Accordingly, the gas burst is effected at the end of the stroke of member 18 as illustrated in phantom line in FIGURE 12.

Figure 7:
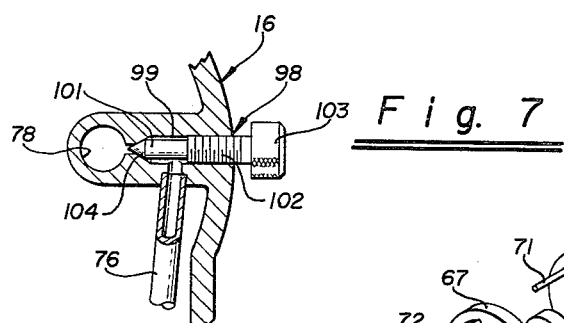
FIGURE 7 is a fragmentary cross-sectional view taken substantially on the plane of line 7—7 of FIGURE 5.
Figure 9:
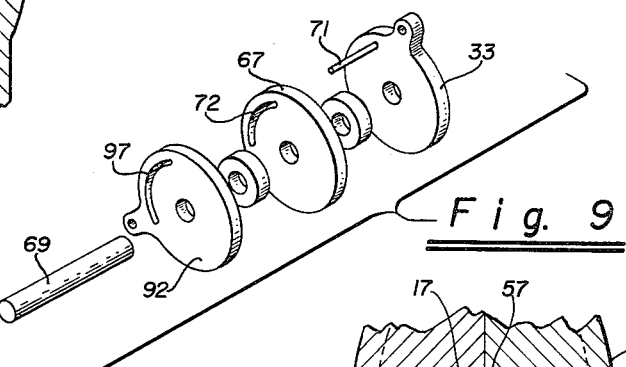
FIGURE 9 is an exploded perspective view of a portion of the mechanism.

As another feature of the present instrument means 98 is provided for regulating the strength of the burst of compressed gas to correspond with the plasticity and viscosity of the material 21 and to control the velocity of discharge of the pellet into the prepared cavity of the tooth. As here shown this means is provided by an auxiliary manually adjustable valve in the line leading to the barrel as shown in FIGURE 7. As here shown the housing 16 is formed with a needle valve chamber 99 which is connected to the barrel chamber end 78 and the upper end of tube 76. A needle valve 101 is mounted in chamber 99 and is provided with a threaded shank 102 threaded in the housing and projecting therefrom for convenient manual engagement of a knob 103 provided on the outer end of the shank. Upon rotation of knob 103 valve 101 may be moved to and from its seat 104 so as to control the rate of flow of gas into the barrel chamber 78. Regulation of gas pressure by means of valve 98 enables the operator to use different consistencies of, say, amalgam mix, starting for example with a wet mix and ending with a dry mix.

As another feature of the present device barrel 17 may be easily and conveniently removed for cleaning and sterilizing. As will be best seen in FIGURES 1 and 10 the housing is formed with an internal cylinder 106 which slidably receives one end portion of barrel 17, the inner end 57 of the barrel extending back into the cylinder to help in defining chamber 19 and end chamber 78 above referred to. Means for detachably holding the barrel in position here includes a plurality of spring pressed ball detents 107 which are mounted in the housing as seen in FIGURE 10 for riding in an annular groove 108 in the barrel. This arrangement not only provides for a snap action holding of the barrel in the housing but also for relative rotation of the barrel. In keeping with this construction and as a further feature of the present device the barrel is formed with a curved or offset outer end portion 109 which is designed for positioning in registration with a prepared cavity to be filled and which may be accordingly rotated to various selected angular positions. Indentations may be formed in groove 108 for receiving the ball detents 107 in these selected rotated positions of the tip, to thereby afford a snap action indexing of the barrel in its various rotated positions.

As a further feature of the present construction the tip portion 109 is formed of transparent material to permit the operator to directly view the deposit of plastic material in the prepared cavity. This may be accomplished by forming the entire barrel from a transparent material such as glass or clear thermoplastic, or by providing a separate tip piece made from transparent material. Also preferably and as here shown the tip portion of the barrel is provided with one or more vent openings 111 for relieving pressure in the barrel upon propelling a pellet therethrough.

With reference to FIGURE 1, the housing 16 is preferably formed as a pistol grip for convenient manual engagement and the member 18 is located for convenient engagement by the index finger in the same manner as a trigger of a piston. As hereinabove explained and as depicted in the series of views, FIGURES 10 to 12, a pulling stroke of the trigger member 18 will first advance a column of material 21 through the side opening of the barrel chamber and into registration with the end of the barrel; then advance tube 56 across and closing this side opening and to cut off an end of the column to form the pellet 22; and finally, to trip hammer 87 to produce a momentary opening of valve 23 to release a burst of gas for driving the pellet through the barrel to the tooth to be filled. Preferably the material holder 26, the plunger 29, the tube 56, spider 61, pen 62, the walls of chamber 19, and barrel 17 and its end portion 109, as well as all portions of the device which may come in contact with the material 21, are all formed of mercury resisting material so as to adapt the instrument to the use of the conventional mercury silver amalgam. Also preferably the tubular holder 26 is made of relatively low cost disposable material encouraging a dispensable one-time use of the holder.

I claim:
 1. A dental cavity filling device comprising, a manually held housing including a chamber and a barrel extending therefrom, a tubular holder for plastic cavity filling material demountably positioned in said housing in communication with said chamber, a plunger moveable longitudinally through said holder for advancing a column of material into said chamber, a tube mounted for reciprocation in said chamber for movement across said column to shear off an individual pellet and to position said pellet in registration with said barrel, and a manually operated valve mounted for controlling the admission of gas under pressure to said chamber for driving said pellet through said barrel to a tooth to be filled.
 2. A dental cavity filling device comprising, a manually held housing including a chamber and a barrel extending therefrom, a manually engageable and displaceable member carried by said housing, a tubular holder for plastic cavity filling material demountably positioned in said housing in communication with said chamber, a plunger connected to said member and moveable thereby longitudinally through said holder for advancing a column of material into said chamber, a tube mounted for reciprocation in said chamber and being connected to said member for movement across said column to shear off an individual pellet and to position said pellet in registration with said barrel, and a valve mounted for controlling the admission of gas under pressure to said chamber and being connected to said member for actuation thereby for driving said pellet through said barrel to a tooth to be filled, the aforesaid connections to said member providing a sequential operation of said plunger and tube and valve.
 3. A dental cavity filling device comprising, a manually held housing including a chamber and a barrel extending therefrom, a finger engageable and displaceable trigger member carried by said housing, a tubular holder for plastic cavity filling material demountably positioned in said housing in communication with said chamber, a plunger moveable longitudinally through said holder for advancing a column of material into said chamber, a ratchet mechanism connecting said plunger and trigger member and providing a stepped advancement of said plunger at the initiation of the stroke of said trigger member, a tube mounted for reciprocation in said chamber and being connected to said trigger member for movement across said column sequentially to the aforesaid movement of said plunger to shear off an individual pellet and to position said pellet in registration with said barrel, a valve mounted for providing when open the admission of gas under pressure to said chamber, means connected to and operated by said trigger member adjacent the end of said stroke and sequentially to the movement of said tube to form a pellet to momentarily open said valve to produce a burst of gas for driving said pellet through said barrel to a tooth to be filled, and means regulating the strength of said burst for controlling the velocity of discharge of said pellet into a prepared cavity of the tooth.
 4. A dental cavity filling device comprising, a manually held housing including a chamber and a barrel extending therefrom, said chamber being formed with a side opening, a finger engageable and displaceable trigger member carried by said housing, a tubular holder for plastic cavity filling material demountably positioned in said housing with one end in registration with said side opening, a plunger moveable longitudinally through said holder for advancing a column of material through said side opening into said chamber, a ratchet mechanism connecting said plunger and trigger member and providing a stepped advancement of said plunger at the initiation of the stroke of said trigger member, a tube mounted for reciprocation in said chamber and being connected to said trigger member for movement sequentially to said plunger, said tube moving across and closing said side opening and cutting off an end of said column to form an individual pellet and to position said pellet in registration with said barrel, a valve mounted for providing when open the admission of gas under pressure to said chamber, means connected to and operated by said trigger member adjacent the end of said stroke and sequentially to said tube movement to momentarily open said valve to produce a burst of gas for driving said pellet through said barrel to a tooth to be filled, and means regulating the strength of said burst for controlling the velocity of discharge of said pellet into a prepared cavity of the tooth.

References Cited in the file of this patent

UNITED STATES PATENTS

| | | |
|---|---|---|
| 861,270 | Cruttenden | July 30, 1907 |
| 1,139,017 | Crawford | May 11, 1915 |
| 1,323,585 | Edwards | Dec. 2, 1919 |
| 2,621,655 | Olson | Dec. 16, 1952 |
| 2,837,824 | Moller | June 10, 1958 |

FOREIGN PATENTS

| | | |
|---|---|---|
| 344,713 | Italy | Nov. 17, 1936 |